United States Patent [19]

Pearce

[11] Patent Number: 4,697,737

[45] Date of Patent: Oct. 6, 1987

[54] WIND CONTROLLED SPRAYING

[76] Inventor: George W. Pearce, 32 Monument St., Wenham, Mass. 01984

[21] Appl. No.: 860,691

[22] Filed: May 2, 1986

Related U.S. Application Data

[63] Continuation of Ser. No. 577,140, Feb. 6, 1984, abandoned.

[51] Int. Cl.⁴ .............................................. A01G 27/00

[52] U.S. Cl. ..................................... 239/67; 200/6 A; 200/81.9 R; 239/DIG. 1

[58] Field of Search ..................... 239/67, 69, 70, 568, 239/DIG. 1; 73/188, 189; 200/6 A, 81.9 R; 137/78.1, 78.2, 78.5

[56] References Cited

U.S. PATENT DOCUMENTS

| | | | |
|---|---|---|---|
| 685,590 | 10/1901 | Faltermayer | 73/188 |
| 2,780,937 | 2/1957 | Haynes et al. | 73/189 |
| 2,984,720 | 5/1961 | Fisher | 200/6 A X |
| 3,156,134 | 11/1964 | Forrester | 200/6 A |
| 3,926,369 | 12/1975 | Pearce | 239/1 |
| 4,072,269 | 2/1978 | Berg | 239/67 X |

*Primary Examiner*—Andres Kashnikow

*Assistant Examiner*—Daniel R. Edelbrock

*Attorney, Agent, or Firm*—Charles Hieken

[57] ABSTRACT

A wind-controlled spraying apparatus is arranged to contain electrical contacts and essential mechanical parts within a single housing and to provide switching contacts on a printed circuit board designed as part of a control circuit for the spraying apparatus. The apparatus includes a nozzle that sprays insecticides into the wind for predetermined periods of time in response to changes in wind direction indicated by a wind-blown conducting tube that contacts only one of the switching contacts on the printed circuit board at any time. An open-ended plastic skirt in the form of a truncated cone has inwardly projecting fingers arranged around the skirt end in contact with the bottom surface of the printed circuit board and extending beyond the edge of the hole in the printed circuit board, dimensioned to fit between the switch contacts thereon to prevent the swinging conducting tube from simultaneously striking more than one of the adjacent switch contacts on the printed circuit board and quickly shifting from one contact to the other in response to small changes in wind direction.

3 Claims, 3 Drawing Figures

WIND CONTROLLED SPRAYING

This application is a continuation of application Ser. No. 06/577,140 filed Feb. 6, 1984, now abandoned.

This invention relates generally to spraying apparatus and more particularly to wind-controlled spraying apparatus.

This invention is an improvement of the invention for spraying insecticides into the air for predetermined periods of time in response to changes in wind direction in U.S. Pat. No. 3,926,369 issued Dec. 16, 1975, to George W. Pearce.

According to the invention a spraying apparatus comprises electrical switching contacts for operating such apparatus, contained within a housing and protected from the elements formed on a printed circuit board designed as part of a control circuit for the spraying apparatus.

A spraying apparatus comprises means for sensing wind from a predetermined plurality of directions at a predetermined location, electric circuit means, including a printed circuit board, for intermittently initiating a spray into the air in response to movement of the wind sensing means, and a plurality of fixed switch contact means formed on said printed circuit board, the switch contact means being intermittently electrically connected to the wind sensing means causing the electric circuit means to initiate the spray into the air.

These and other advantages of the invention will be apparent from the following detailed description with reference therein to the accompanying drawing in which.

Figure 1:
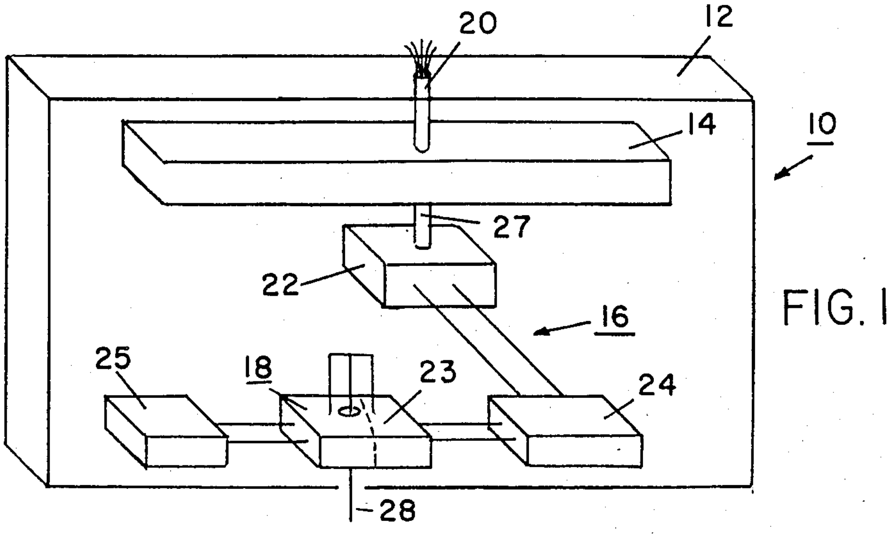
FIG. 1 is a block diagram of an insect fogging assembly arranged according to the invention.

Referring to FIG. 1, there is shown a block diagram of an insect fogging assembly 10 comprising a housing 12 containing a holding tank 14 for insecticide solution, a pump assembly 16, a wind sensitive control system 18 and a spray nozzle 20. Under operating conditions, the insect fogging assembly is suspended from a fixed mount about 15 feet above ground.

The pump assembly 16 is arranged to pump insecticide solute held within the tank 14 through the spray nozzle 20 into the air in response to changes in the direction of the wind. The pump assembly 16 includes a pump 22 operated by a motor 24 and connected by hoses 27 to the tank 14 and the spray nozzle 20. The motor 24 is electrically connected to a source 25 of electrical energy, such as a D.C. battery, and the wind sensitive control system 18. The control system 18 includes a wind sensor in the form of a swinging contact 28 electrically connected to a known fogging control circuit 23 adapted to cause the motor 24 to operate the pump 22 and spray insecticide solute into the air for a predetermined time period when there is a change in wind direction.

Figure 2:
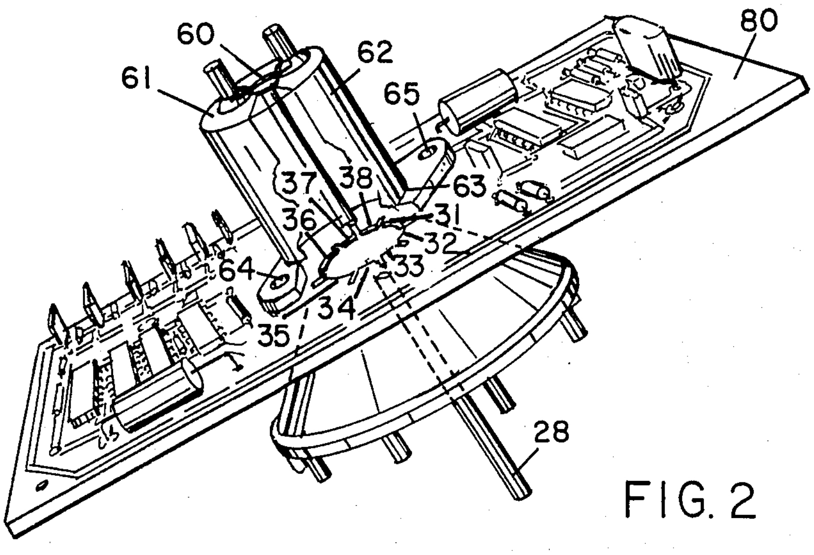
FIG. 2 is an isometric view of the wind sensitive control system of the FIG. 1 assembly.

The swinging contact 28 may be driven by the wind against any of the contacts 31–38 formed on a printed circuit board 80, shown in FIG. 2, on which electrical components comprising the control circuit are mounted.

FIG. 2 of U.S. Pat. No. 3,926,369 issued Dec. 16, 1975, to applicant is a schematic circuit diagram of a suitable fogging control circuit 23. The disclosure in that patent is incorporated by reference herein.

Each of direction selecting contacts 31–38 may be coupled to a gate electrode of an associated SCR to trigger the associated latching circuit when engaged by swinging contact 28.

The invention is embodied in the commercially available COMPU-SPRAY sprayer sold by Mytec, Inc. of Medford, Mass.

Referring to FIG. 2, there is shown a perspective view of the wind sensitive control system 18 of FIG. 1. The swinging contact 28 is a metal tube freely suspended from a metal bar 60 mounted across one end 61 of a hollow plastic tube 62 shown in partial cross section. The metal bar 60 in turn may be connected to transistor T1 shown in FIG. 2 of the aforesaid patent. The opposite end 63 of the plastic tube 62 is attached by bolts 64,65 to the printed circuit board 80 so that the unattached end of the swinging contact 28 extends through a hole formed in the printed circuit board 80 and the housing 12 and into free space. The end of the swinging contact 28 extending into free space is intended to move in the direction of the wind until the swinging contact 28 strikes a side of the hole in the printed circuit board 80.

The contacts 31–38 are fixed paths of conductive material formed along the side of the hole in the printed circuit board 80 and extend to the top and bottom surfaces of the printed circuit board 80. Thus, contacts 31–38 are contained within the housing 12 and protected from the elements.

Figure 3:
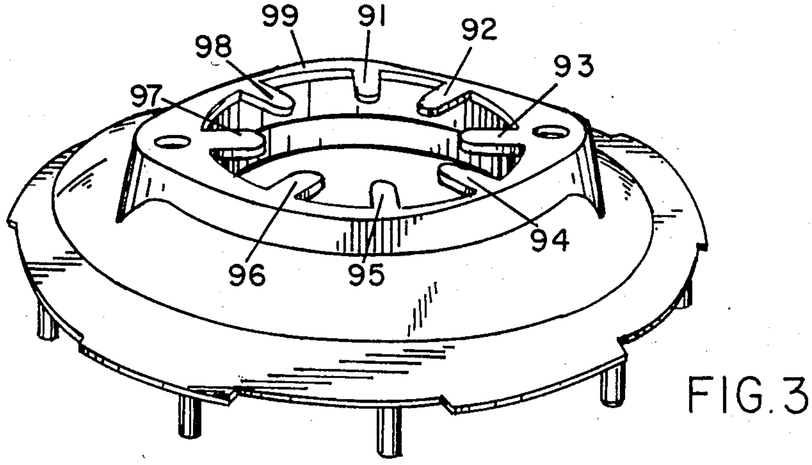
FIG. 3 is an isometric view of a fixed contact insulator.

Referring to FIG. 3, there is shown an open ended plastic skirt in the form of a truncated cone attached by bolts to the bottom surface of the printed circuit board 80. Inwardly projecting fingers 91–98 are arranged around the skirt end in contact with the bottom surface of the printed circuit board 80. The fingers 91–98 extend beyond the edge of the hole in the printed circuit board 80 and are dimensioned to fit between the contacts 31–38 to prevent the swinging contact 28 from simultaneously striking more than one of adjacent contacts 31–38 and quickly shifting from one contact to the other in response to small changes in wind direction.

There has been described novel apparatus and techniques for wind-controlled spraying. It is evident that those skilled in the art may now make numerous uses and modifications of and departures from the specific apparatus and techniques disclosed herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Spraying apparatus for spraying into the air comprising:

wind sensing means for sensing wind from a predetermined plurality of directions at a predetermined location comprising a swinging contact, electric circuit means, including a printed circuit board, said electric circuit means operatively connected to a spray means for intermittently initiating a spray into said air in response to movement of said swinging contact, a plurality of fixed switch contact means formed on said printed circuit board for intermittent contact with said swinging contact, said fixed switch contact means being intermittently electrically connected to said swinging contact, causing said electric circuit means to initiate said spray into said air, wherein said printed circuit board is formed with an aperture and said fixed contact means are formed by a plurality of fixed paths of conducting material along the side of the aperture and extending along top and bottom surfaces of said printed circuit board, a housing above said printed circuit board and comprising means for protecting said fixed contact means from the elements, said swinging contact having one end freely suspended from a conducting rod electrically connected to said electric circuit means and an opposite end intermittently in contact with said first contact means when moved by the wind, said swinging contact passing through said circuit board aperture and free to engage any one of said fixed contact means without contacting another thereof, and inwardly projecting fingers attached to said printed circuit board each between a pair of said fixed switch contact means comprising means for preventing said swinging contact from simultaneously contacting more than one of said fixed switch contact means and quickly shifting from one of said fixed switch contact means to another in response to small changes in wind direction, thereby preventing electrical connection of said swinging contact simultaneously to more than one of said fixed switch contact means.

2. Spraying apparatus for spraying into the air comprising:

wind sensing means for sensing wind from a predetermined plurality of directions at a predetermined location comprising a swinging contact, electric circuit means, including a printed circuit board, said electric circuit means operatively connected to a spray means for intermittently initiating a spray into said air in response to movement of said swinging contact, a plurality of fixed switch contact means formed on said printed circuit board for intermittent contact with said swinging contact, said fixed switch contact means being intermittently electrically connected to said swinging contact, causing said electric circuit means to initiate said spray into said air, and means for preventing electrical connection of said swinging contact simultaneously to more than one of said fixed switch contact means, said means for preventing electrical connection comprising inwardly projecting fingers attached to said printed circuit board each between a pair of said fixed switch contact means comprising means for preventing said swinging contact from simultaneously contacting more than one of said fixed switch contact means and quickly shifting from one of said fixed switch contact means to another in response to small changes in wind direction, thereby preventing electrical connection of said swinging contact simultaneously to more than one of said fixed switch contact means.

3. Spraying apparatus in accordance with claim 2 wherein said swinging contact has one end freely suspended from a conducting rod electrically connected to said electric circuit means and an opposite end intermittently in contact with said fixed switch contact means when moved by the wind, said printed circuit board being formed with an aperture and said fixed switch contact means being formed by a plurality of fixed paths of conducting material along the side of the aperture and extending along top and bottom surfaces of said printed circuit board, said swinging contact passing through said circuit board aperture and free to engage any one of said fixed switch contact means without contacting another thereof.

* * * * *